INVENTORS
HOBSON J. ELMORE, JR.
&
BY WILLIAM F. ELMORE

ATTORNEYS

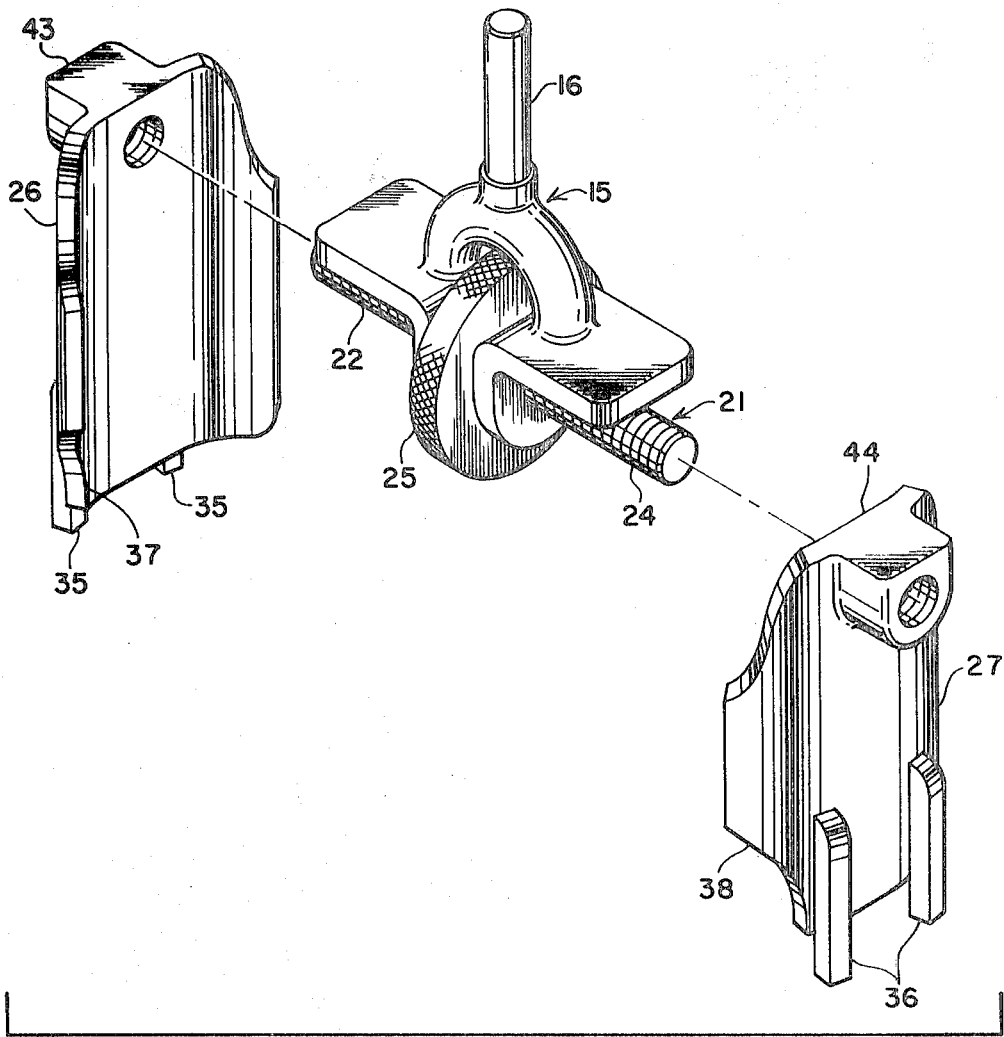
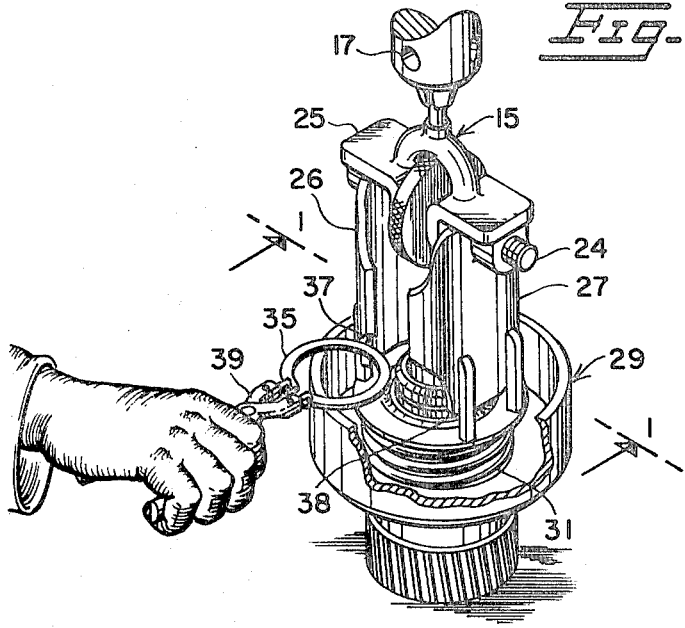

3,618,195
CLUTCH DRUM SPRING COMPRESSOR
Hobson J. Elmore, Jr., 214 Ridgeway Drive, Gulfport,
  Miss. 39501, and William F. Elmore, 707 Windsor
  Drive, Birmingham, Ala. 35209
    Filed June 20, 1969, Ser. No. 835,190
        Int. Cl. B23p 19/04
U.S. Cl. 29—227                                  2 Claims

ABSTRACT OF THE DISCLOSURE

A clutch drum spring compressor adapted for use in assembling or disassembling automatic transmission parts formed of a supporting body adapted to be fitted into a drill press chuck and which has brace parts depending from a turn buckle assembly thereon and adapted to be laterally adjusted to fit against the spring plate that is to be forced downwardly against the action of the spring and to allow for easy removal for replacement of the snap retaining ring. The spring plate is contacted by four projections carried on the brace members and the brace members held against lateral displacement on the turn buckle screw by flat surface engagement with corresponding flat surfaces of the main body support.

---

This invention relates to a clutch drum spring compressor for use in assembling and disassembling of the transmission.

It is the principal object of the present invention to provide a simple and effective clutch drum spring compressor adapted for engagement to an automatic transmission to effect the disassembly of the transmission and particularly of the clutch piston seal ring that has to be removed to permit the removal of the clutch piston and the assembly of the seal ring after the piston has been replaced.

It is another object of the invention to provide a clutch drum spring compressor in which the work engaging parts can be readily adapted by a turn buckle means for engagement with different size diameter parts.

It is still another object of the invention to provide a clutch spring compressor for automatic transmission which is adapted to be fitted into a press chuck so that the press may apply the pressure required to compress the spring and free the spring lock snap ring.

Other objects of the invention are to provide a clutch drum spring compressor having the above objects in mind, which is of simple construction, has a minimum number of parts, easy to adjust the different outer diameters, will supply even pressure at the opposite sides of the spring, strong, durable, effective and efficient in use.

For a better understanding of the invention, reference may be had to the following detailed description taken in connection with the accompanying drawings, in which FIG. 1 is a vertical sectional view of the spring compressor with portions broken away to show and illustrate the operation of the turn buckle, the view being taken generally on line 1—1 of FIG. 5.

FIG. 4 is an exploded perspective view of three main parts of the assembly.

FIG. 5 is a perspective view of the spring compressor being applied by a press under the clutch spring and with the illustration being made as to the manner in which the snap ring is inserted in place over the spring plate.

Figure 1:
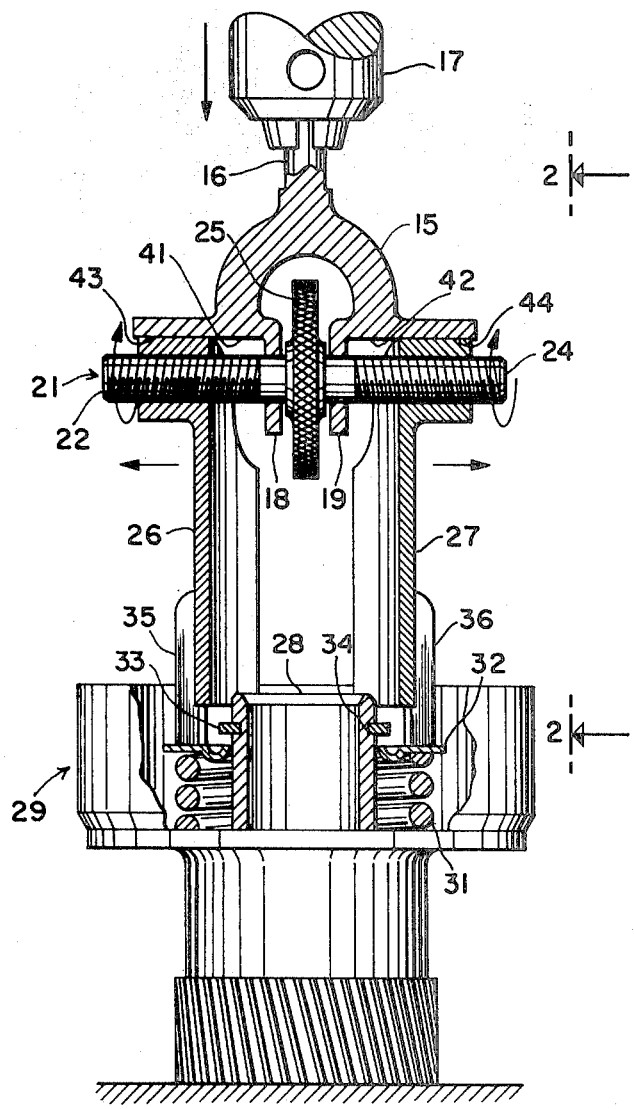
Figure 2:
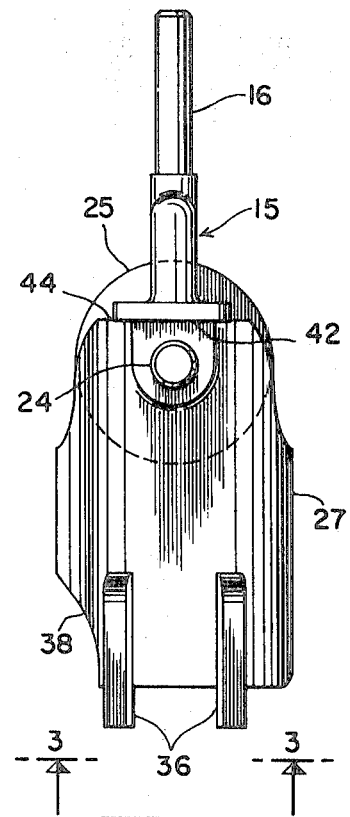
FIG. 2 is an illustrative view taken from one side of the compressor and as viewed on line 2—2 of FIG. 1.
Figure 3:
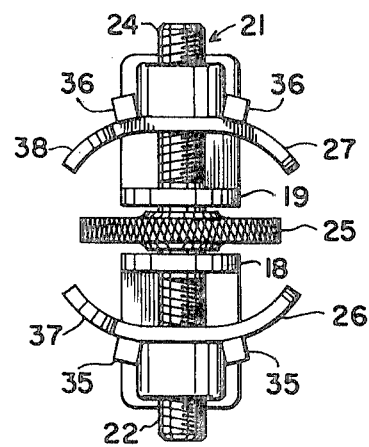
FIG. 3 is a bottom plan view of the assembled compressor as viewed on line 3—3 of FIG. 2.

Referring now to the figures, 15 represents a supporting body having a shank 16 adapted to be fitted into a drill press chuck 17 for the purpose of supplying downward pressure in the use of the device. The supporting body 15 has depending parallel supporting portions 18 and 19 for a turn buckle screw 21 having right and left hand thread portions 22 and 24. The shaft 21 is journalled in the supporting portions 18 and 19 and can be turned by an enlarged diameter knurled hand wheel formation 25. The shaft 21 supports upon its right and left hand thread portions depending brace members 26 and 27 generally of curved cross section to conform to and surround a rounded central sleeve portion 28 of a clutch assembly part 29. This clutch assembly part has a heavy duty spring 31 surrounding the sleeve portion 28 and is retained against removal from the sleeve portion 28 by a spring plate 32 and a snap retaining ring 33 fitted into an external groove 34 on the sleeve portion 28. The spring plate 32 and the spring 31 must be compressed to permit the removal or replacement of the snap retaining ring 33. In order to effectively engage the spring plate 32 depending parallel spaced projections 35, 36 depend respectively from the lower ends of the depending brace members 26 and 27 to supply equalized force about the spring plate 32 to effect even downward displacement of the same against the action of the heavy coiled spring 31.

Depending brace members 26 and 27 are respectively cut away at 37 and 38 to allow for the insertion as illustrated in FIG. 5 on removal of the snap retaining ring 33 by means of special pliers 39 squeezed by the hand of a mechanic to separate the free ends of the snap ring 35 and enlarge its internal diameter.

The underside of the supporting body 15 has flat under faces 41 and 42 allowing for flush engagement with flat faces 43 and 44 of the respective depending brace members 26 and 27 to steady these members against lateral displacement and at the same time distribute the downward force over the same when the drill chuck 17 is forced downwardly the action of the clutch spring 31.

It should be apparent that by turning the knurled hand wheel 25 that the flat faces 43 and 44 can be adjusted inwardly and outwardly over the flat under faces 41 and 42 of the supporting body 15 and so as to accommodate the depending projections 35 and 36 of the members 26 and 27 on the spring plate 32, simply by turning the hand wheel adjusting the spring compressor to permit the fitting of the same to all sizes, makes and models of automatic transmission for either assembly or reassembly of the transmission parts.

It should be apparent that by this device a large number of ordinary tools that may have been required for this purpose will not be needed.

The force exerted against the shank 16 of the supporting body 15 by the drill chuck 17 is transmitted to the spring plate to eliminate the spring pressure against the snap retaining ring seated in the groove 34 of the sleeve portion 28 about which the spring 31 is mounted in the transmission or clutch part 29. Four points of contact with the spring plate 32 is effected with the projections 35 and 36 so as to equally distribute force applied to the spring plate 32.

What is claimed is:

1. A clutch drum spring compressor for use in disassembling clutch parts of automatic transmissions comprising a main supporting body adapted to attach to a drill press and having spaced depending parallel supporting portions, a turn buckle rotatable upon the body and journaled in and between the depending supporting portions, brace elements carried by the opposite ends of the turn buckle, said brace elements being adjustable by the turn buckle for different size parts and to permit the same to overlie an internal spring portion of the clutch and to press the spring and spring plate so that a snap retaining ring on the sleeve portion of the clutch may be readily removed or replaced by an appropriate ring expanding tool, said supporting body having an upwardly extending shank adapted to be received in a drill chuck and two depending central portions rotatably receiving the turn buckle, said supporting body further having flat underfaces and said brace elements having top flat faces engageable with the underfaces of the supporting body while being adjustable upon the turn buckle portions to hold the brace elements against tilting displacement upon the turn buckle, and spaced vertically extending projections depending from the lower ends of the brace elements to distribute the pressure upon the spring plate while the brace elements overlie the spring portions.

2. A clutch drum spring compressor for use in disassembling clutch parts of an automatic transmission as defined in claim 1, and the lower ends of the brace elements being cut away at their opposing sides to allow for the insertion and removal of the snap retaining ring.

References Cited

UNITED STATES PATENTS

| | | | |
|---|---|---|---|
| 3,178,808 | 4/1965 | Pendley | 29—227 |
| 3,253,486 | 5/1966 | Beck | 81—165 X |
| 3,504,419 | 4/1970 | Bozsanyi | 29—227 |

ANDREW R. JUHASZ, Primary Examiner

L. GILDEN, Assistant Examiner

U.S. Cl. X.R.

29—240.5, 282